(No Model.)
G. BURKHARDT.
METHOD OF AND APPARATUS FOR OBTAINING STARCH FROM GRAIN.
No. 251,827. Patented Jan. 3, 1882.
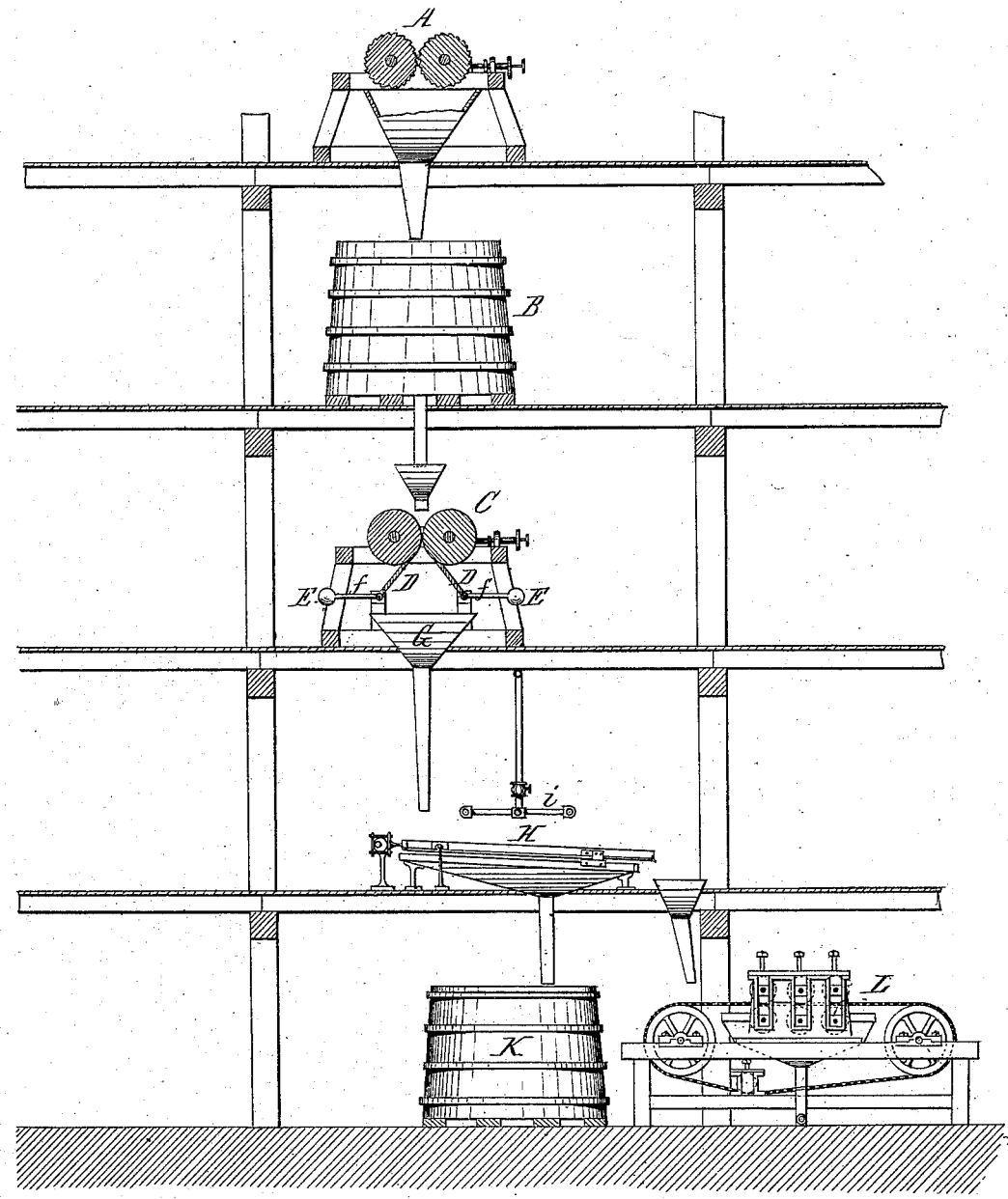

UNITED STATES PATENT OFFICE.

GOTTFRIED BURKHARDT, OF BUFFALO, NEW YORK.

METHOD OF AND APPARATUS FOR OBTAINING STARCH FROM GRAIN.

SPECIFICATION forming part of Letters Patent No. 251,827, dated January 3, 1882.

Application filed August 6, 1881. (No model.)

*To all whom it may concern:*

Be it known that I, GOTTFRIED BURKHARDT, of the city of Buffalo, in the county of Erie and State of New York, have invented a new and useful Improvement in Methods of and Apparatus for Obtaining Starch from Grain, of which the following is a specification.

This invention relates more especially to an improved method and apparatus of manufacturing starch from Indian corn or maize.

The object of this invention is to increase the yield of starch; and this object is accomplished by detaching all of the starch-particles completely from the bran and effecting a thorough separation of the starch from the bran.

My invention consists, to that end, of the hereinafter-described method of obtaining starch from grain, which consists, essentially, in first cracking or grinding the grain coarsely, whereby the kernels are opened and the interior thereof exposed to the action of the water, then steeping the cracked grain, then crushing the steeped grain between rolls, whereby the starch is reduced to powder and the bran to flakes, and then separating the starch from the bran by sifting; also, of the apparatus whereby this novel method of obtaining starch from grain is carried out, as will be hereinafter fully set forth.

The accompanying drawing represents a sectional elevation of the apparatus employed in carrying out my improved process.

A represents a pair of corrugated rolls or a pair of millstones, between which the corn is cracked or coarsely ground, so as to reduce the kernels to coarse fragments, without, however, pulverizing the bran.

B represents a steep tub of any suitable construction, into which the coarsely-ground grain passes from the rolls or millstones A, and in which the grain is steeped a sufficient length of time to thoroughly soften the grain. As the grain is broken into fragments it is more readily permeated by the water and softened in less time and at a lower temperature than when the whole grain is steeped, thereby effecting an important saving in time and expense and preventing loss by overheating or boiling the grain.

C represents one or more pairs of smooth crushing-rolls, which receive the steeped grain from the tub B, and which crush the grain to such fineness that the starch-particles are completely reduced to powder and detached from the bran, while the latter is flattened to flakes of greater or less size. The presence of the water in the steeped grain permits a complete extraction and separation of the starch-particles from the woody or fibrous particles of the bran. If desired, a stream of water may be conducted between the crushing-rolls in order to aid in this separation.

D represents scraper-plates pivoted in the roller-frame below the crushing-rollers C, and bearing with their upper edges against the rollers. The plates D are held firmly against the rollers by weights E, which are attached to arms *f* projecting horizontally from the pivot ends of the plates, or by suitable springs applied to the plates. The plates D detach the crushed material adhering to the rolls and direct it into the hopper G, from which it is conducted to separating-sieves H. The latter may be of any suitable and well-known construction and effect a separation of the starch from the bran. The starch is washed through the meshes of the sieve by sprays of water delivered upon the sieve by pipes *i* and collected in a tub or tank, K, while the bran escapes over the tail end of the sieve and is conducted to a squeezing apparatus, L, of well-known construction, whereby the moisture still remaining in the bran is pressed out of the same. The starch contained in the water which is collected in the tub K is then washed, settled, or treated in any suitable and well-known manner, in accordance with the requirements of the ultimate product desired to be produced, whether laundry or culinary starch, grape-sugar, glucose, spirits, &c.

By my improved process the yield of starch is greatly increased, as the grain is steeped more thoroughly and at a lower temperature and in less time, thereby avoiding the causes of loss of starch which exist in the ordinary methods of treating the grain, while the subsequent extraction and separation of the starch from the bran is also more effectual and complete.

I am aware that rollers have been used for reducing the grain employed in the manufacture of starch, and this I do not broadly claim.

I claim as my invention—

1. The herein-described method of obtaining starch from grain, which consists in first coarsely grinding or cracking the grain, then steeping the broken grain, then crushing the steeped grain between rolls, whereby the starch is reduced to powder and the bran flattened out to flakes, and then separating the starch from the bran by sifting, substantially as set forth.

2. In an apparatus for manufacturing starch from grain, the combination of a preliminary reducing apparatus, A, whereby the grain is coarsely broken, a steep, B, in which the broken grain is softened, a pair of crushing-rolls, C, which operate upon the steeped grain, and whereby the starch is reduced to powder and the bran to flakes, and a sieve, H, whereby the bran is separated from the starch, substantially as set forth.

3. In an apparatus for manufacturing starch from grain, the combination of corrugated preliminary reducing-rollers A, a steep, B, smooth crushing-rolls C, and a sieve, H, in the manner and for the purpose set forth.

4. The combination, with the crushing-rolls C, of self-adjusting scraper-plates D, substantially as set forth.

G. BURKHARDT.

Witnesses:
 JNO. J. BONNER,
 CHAS. J. BUCHHEIT.